United States Patent [19]

Verheijen

[11] Patent Number: 4,793,513
[45] Date of Patent: Dec. 27, 1988

[54] DEVICE FOR DELIVERING HOT WATER

[75] Inventor: Jan J. Verheijen, Heiloo, Netherlands

[73] Assignee: Verheijen B.V., Heiloo, Netherlands

[21] Appl. No.: 907,353

[22] Filed: Sep. 15, 1986

[51] Int. Cl.$^4$ ............................................. B67D 5/30
[52] U.S. Cl. ...................................... 222/14; 222/56;
137/624.15; 99/323.3
[58] Field of Search ..................... 222/56, 14, 21, 22,
222/16, 68, 64, 52; 141/94, 95; 137/386, 624.14,
624.15; 99/323.3

[56] References Cited

U.S. PATENT DOCUMENTS 3,443,508  5/1969  Reynolds et al. ..................... 99/282
4,174,169  11/1979  Melander et al. ............... 137/624.15

FOREIGN PATENT DOCUMENTS 3205719  11/1982  Fed. Rep. of Germany .
1482199  6/1979  France .
6804851  4/1968  Netherlands .
8103533  7/1981  Netherlands .
6405796  9/1981  Netherlands .
464784  11/1973  U.S.S.R. ................................. 222/56

Primary Examiner—Kevin P. Shaver
Assistant Examiner—Kenneth Noland
Attorney, Agent, or Firm—Cushman, Darby & Cushman

[57] ABSTRACT

Device for delivering hot water comprising a hot water tank (1) in which a thermostatically controlled heating unit (3) is provided, a syphon (4) for the removal of hot water, the inlet opening of which syphon is situated at a first level (5), a cold water inlet pipe (6) in which a shut-off valve (7) controlled by a control unit (8) is provided, and a level probe (10) at a second level (9) above the highest point of the syphon. After the opening of the shut-off valve in response to a start signal the level probe (10) detects when the rising surface of the water has reached the second level and then delivers a signal to the control unit in order to close the shut-off valve. A second level probe at a third level above the first level but below the second level, provides an "open" signal to the shut-off valve unless the presettable end setting of a counter, counting the number of generated "open" signals, has been reached.

5 Claims, 1 Drawing Sheet

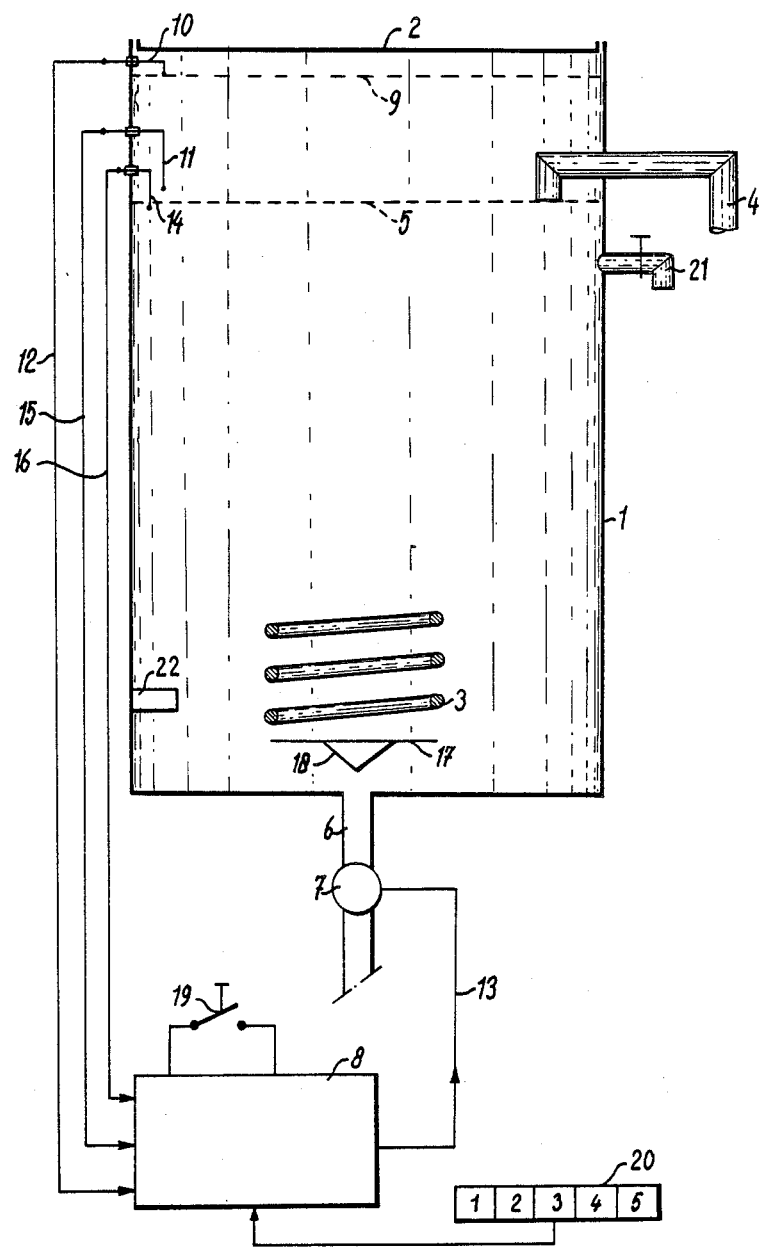

DEVICE FOR DELIVERING HOT WATER

The invention relates to a device for delivering hot water comprising a hot water tank in which a thermostatically controlled heating unit is provided, a syphon for the removal of hot water, the inlet opening of which syphon is situated at a first level, a cold water inlet pipe in which a shut-off valve controlled by a control unit is provided, and a level probe at a second level above the highest point of the syphon, which probe, after the opening of the shut-off valve in response to a start signal, detects when the surface of the water, which rises as a result of the inlet of cold water, has reached the second level and then delivers a signal to the control unit in order to close the shut-off valve.

Such a device is known from the Dutch Patent Application No. 8,103,533. With this known device only a certain volume of hot water can be delivered each time. This volume is determined by the volume of the water reservoir between the first level, being the water level in which the device is quiescent, and the second level which is monitored by the said level probe.

The volume of the quantity of hot water to be delivered can only be reduced by moving the level probe to a lower position. In that case the level probe itself will first of all have to be constructed in a manner such that it is displaceable or adjustable and, furthermore, the upper part of the water tank will not be used if the level probe is displaced to a lower level so that the actual dimensions of the whole device are larger than is necessary in said situation. Furthermore, the volume of the quantity of hot water to be delivered can only be increased by bringing the probe to a higher level but in practice that will not be possible or scarcely be possible because, with an efficient design of the device, said probe will already be situated near the top of the tank. An enlargement of the volume therefore requires an enlargement of the whole tank, which is not compatible with the general endeavour to limit, if possible, the size of such devices.

The object of the invention is therefore to construct a device of the abovementioned type in a manner such that a quantity of hot water, varying as required, can be delivered without the abovementioned disadvantages having to be accepted into the bargain at the same time.

This object is fulfilled in the case of an invention of the type mentioned in the introduction in that a second level probe is provided at a third level above the first level but below the second level, that the control unit is provided with a presettable counter unit, which counter unit advances by one step every time a signal is delivered by the second level probe and then delivers an "open" signal to the shut-off valve unless the predetermined end setting of the counter has been reached. With a device constructed in this manner batches of hot water are therefore delivered for which the volume of each batch is determined by the volume of the water tank between the first level probe and the second level probe, it being understood that the last batch is determined by the volume of the hot water tank between the first level at which the inlet opening of the syphon is situated and the second level of the uppermost level probe. In order to make this last batch at least approximately equal to the batches delivered earlier, the second probe is preferably placed immediately above the first level, i.e. immediately above the level at which the syphoning action ceases.

For each batch of hot water delivered via the syphon a corresponding quantity of cold water will be introduced at the bottom of the tank. If the counter is set to a relatively large number of batches, then the boundary level between hot water and cold water will possibly rise gradually, unless the capacity of the heating unit is so large that the quantity of cold water introduced can be brought to the required temperature within the batch delivery time. However, that requires relatively large heating units which form a heavy load during each batch delivery time for the electrical mains to which they are connected. Such heating units are expensive and inefficient. It is therefore preferable that the counter can pass through a maximum number of steps, which maximum corresponds to the delivery of a quantity of hot water via the syphon which is equal to or less than the capacity of the hot water tank above the heating unit. The limitation to "above the heating unit" is introduced to ensure that the heating unit always remains under water as a result of which the risk of overheating, and consequently of damage, of the heating unit is minimized.

A further disadvantage of the known device is the use of a separate cold water tank above the actual hot water tank. The cold water flows via the cold water inlet pipe into the interior of said cold water tank and is further transported via a downcomer to the vicinity of the bottom of the actual hot water tank. All the means used for the creation of said separate cold water tank, viz. the wall and base elements of the cold water tank, the downcomer projecting from the base of the cold watertank and the venting tube extending through the cold water tank make the whole device fairly complicated, as a result of which, on the one hand, the costs of manufacturing the device are increased while, on the other hand, the maintenance of the device is made more difficult. The Applicant has now realised that a device of the type discussed here can be substantially simplified if the cold water inlet pipe debouches at the bottom of the hot water tank at a level below the heating unit.

In order to guarantee as uniform an inflow of the cold water as possible and to ensure that as little mixing as possible takes place with the hot water pushed upwards by said cold water, the incoming cold water flow is preferably directed approximately vertically upwards and an essentially horizontal deflection plate is provided below the heating unit at a short distance from the debouchment of the cold water inlet pipe. This achieves the result that the cold water, after deflection by the deflection unit, flows in principle horizontally in all directions, as a result of which turbulences are avoided as much as possible and as little mixing as possible takes place between cold water and hot water.

In order to increase the uniformity of the flow, the horizontal deflection plate is preferably provided in the central part above the debouchment of the cold water inlet pipe with a conically projecting section by means of which a gradual deflection of the inflowing cold water is obtained.

The invention will be discussed in more detail below by reference to the accompanying FIGURE wherein an embodiment of the invention is shown very diagrammatically.

The device shown in the FIGURE comprises a hot water tank 1 closed at the top by a lid 2, while the heating unit 3 is provided near the bottom inside said reservoir. Said heating unit 3 is connected to the electrical mains via a thermostatically controlled switch 22.

Details of said thermostatic control are assumed to be known to those skilled in the art and are therefore not discussed in more detail.

In a side wall of the tank 1 there is situated a syphon drain 4, the inlet opening of which is situated at a level 5 in the hot water tank. Cold water can be introduced into the tank via the cold water inlet pipe 6 in which there is provided a shut-off valve 7 controlled by means of an electrical signal. In the quiescent state the shut-off valve 7 is closed and the hot water surface is indicated by the level 5.

Furthermore, in the hot water tank there are provided a number of electrodes 10, 11, 14 which are led in an insulated manner through the wall of the hot water tank and which are each connected to a control unit 8 via a conductor 12, 15, 16. The control unit 8 receives not only input signals from these level probes 10, 11, 14, but also receives an input signal from a start push button 19 and from a selection mechanism 20. The control unit 8 further delivers an output signal to the shut-off valve 7.

As already stated, the water surface of the hot water is at the level 5 in the quiescent state. The user now first of all uses the selection mechanism 20 to specify how many batches of hot water have to be delivered. Said selection mechanism may specify the number of batches, but may, of course, also be calibrated in liters or other volume units. For the discussion below it is assumed that the selector 20 is set to two batches.

The user then presses the start button 19, as a result of which the control unit 8 will deliver an "open" signal to the shut-off valve 7 via the conductor 13 so that cold water begins to flow into the tank 1 via the cold water inlet pipe 6. This cold water flowing in at the bottom will push the hot water upwards so that the water level rises. When the water has risen to the level 9, the probe 10 will come into contact with the water level and as a result deliver a signal to the control unit 8 which, in response thereto, transmits a "shut" signal via the conductor 13 to the shut-off valve 7, as a result of which the latter is closed. In the meantime the syphon 4 has come into operation and hot water is already being delivered from the tank 1 to a further device, for example a drink preparation device such as a coffee making machine. It is pointed out that the delivery rate via the syphon 4 must be lower than the inlet rate via the inlet pipe 6. As a result of the syphon action the level of the hot water in the tank 1 will drop until the level has dropped below the probe 11. As soon as the probe 11 emerges from the water, this will be detected by the control unit 8 and, in response thereto, a counter present in the control unit 8 is advanced one step further. The counter setting then reached, which in the example has reached the setting "1", is then compared with the setting set by the selector 20. Because the selector has been set "2", the comparator circuit in the control unit 8 detects "nonequality" and, in response thereto, the control unit 8 will deliver an "open" signal via the conductor 13 to the shut-off valve 7 so that cold water again flows into the tank 1 and the level of the water again begins to rise. When the water surface again reaches the level 9, the probe will again deliver a signal to the control unit 8 which, in response thereto, again delivers a "shut" signal via the conductor 13 to the shut-off valve 7, which is thereby closed. The water level will then again fall until the probe 11 again emerges from the water and thereby generates a signal in the control unit 8. In response thereto, the counter in the control unit 8 will advance from setting "1" to setting "2". The comparator circuit in the control unit 8 compares said setting with the setting set via the selector 20 and in this case detects equality. The unit 8 will therefore not deliver any more "open" signals to the shut-off valve 7. The water level will therefore continue to drop somewhat further as a result of continuing delivery of hot water via the syphon 4 until the level 5 is reached and the syphon action ceases. The device is thereafter again in the quiescent state.

It will be clear that every time the start button 19 is pressed, not only is an "open" signal delivered to the shut-off valve 7 but the said counter is also internally set to zero.

It is pointed out that, on the one hand, the probe 11 is placed at a level so high that the delivery of hot water is preferably not interrupted, but on the other hand, is also placed again so close to the level 5 as to ensure that the last batch, which is determined by the volume between the level 9 and the level 5 is as equal as possible to the preceding batches which are determined by the volume between the level 9 and the level at which the probe 11 is situated.

The figure also further shows a drain cock 21. A quantity of hot water can be drained off via said cock independently of the syphon mechanism. During the draining off the level of the hot water will fall and a further probe 14 will quite quickly emerge from the water and in doing so generate a signal in the control unit 8. Said signal will, possibly with a time delay, result in the control unit 8 delivering an "open" signal via the conductor 13 to the shut-off valve 7 in order to make the hot water level in the tank 1 rise again as a result of the inlet of cold water. As soon as the probe 14 again comes into contact with the water, the shutoff valve 7 will again be closed in response to a signal then generated in the control unit 8. It is pointed out that this facility for draining off a relatively small quantity of hot water via a separate cock 21 has already been described in the abovementioned Dutch Patent Application No. 8,103,533 and does not therefore form any part of the present invention.

I claim:

1. An apparatus for delivering hot water, comprising:
   (a) a water tank;
   (b) a thermostatically controlled heating unit installed at a relatively low level within said water tank;
   (c) a syphonic tube for discharging hot water from the tank, said tube being installed in a sidewall of said tank, whereby an inside end of said tube is at a level above the heating unit;
   (d) a cold water inlet pipe connected to the tank at a level underneath said heating unit;
   (e) a shut-off valve, installed in the cold water inlet pipe and controlled by a control unit;
   (f) two water level detecting probes, the first probe being positioned at a first level above the inside end of the syphonic tube and the second probe being positioned at a second level above the inside end of the syphonic tube but below the first level, wherein said first probe delivers a signal to the control unit which in response closes the shut-off valve as soon as the water reaches the first level, and said second probe delivers a signal to the control unit as soon as the water reaches the second level; and
   (g) a start means to provide a start signal to the control unit which in response opens the shut-off valve, wherein said control unit comprises a counter, which is presettable to a predetermined end setting and advances by one step from an initial setting every time a signal is received from said first probe and generates a signal to open the shut-off valve as the signal from the second probe is received unless said presettable end setting of the counter has been reached.

2. An apparatus according to claim 1, wherein the second level is situated immediately above the level of the inside end of the syphonic tube.

3. An apparatus according to claim 1, wherein the counter passes through a maximum number of steps, which maximum corresponds to the delivery of a specific quantity of hot water via the syphonic tube, said quantity being equal to or somewhat less than the capacity of the hot water tank above the heating unit in the quiescent state.

4. An apparatus according to claim 1, wherein the cold water inlet pipe debouches at the bottom of the tank.

5. An apparatus according to claim 4, wherein the cold water flowing in from the cold water inlet pipe is directed approximately vertically upwards and that an essentially horizontal deflection plate is provided below the heating unit at a short distance from the debouchement of the cold water inlet pipe.

* * * * *